Patented Sept. 20, 1938

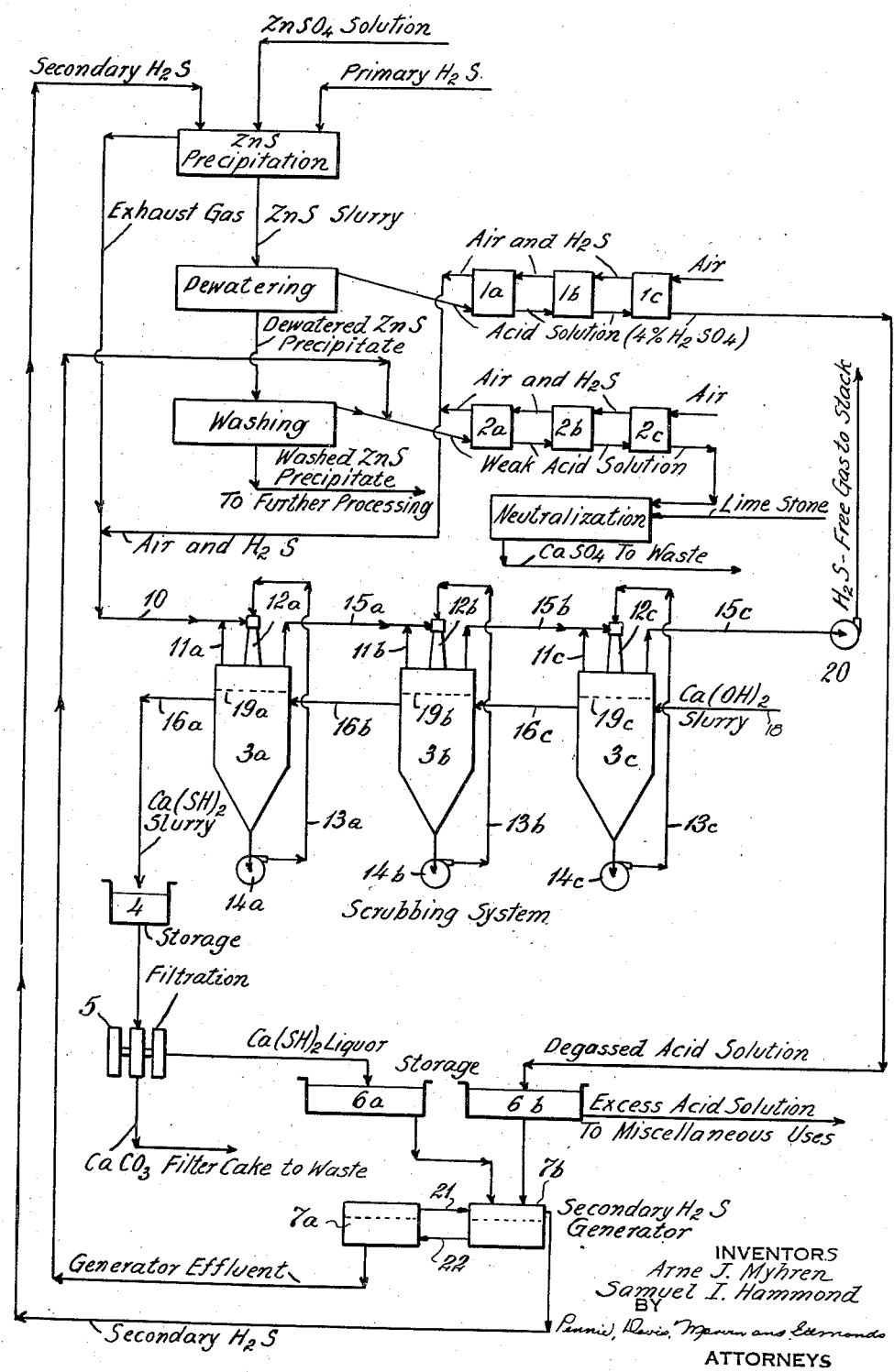

2,130,742

UNITED STATES PATENT OFFICE 2,130,742

PRECIPITATION OF ZINC SULPHIDE WITH HYDROGEN SULPHIDE RECOVERY

Arne J. Myhren and Samuel I. Hammond, Palmerton, Pa., assignors to The New Jersey Zinc Company, New York, N. Y., a corporation of New Jersey Application April 1, 1937, Serial No. 134,220

4 Claims. (Cl. 23—135)

This invention relates to the recovery of hydrogen sulphide, and also contemplates purifying the recovered hydrogen sulphide from carbon dioxide. The invention is particularly applicable to the recovery of waste hydrogen sulphide in processes in which zinc sulphide is precipitated from zinc salt solutions by hydrogen sulphide gas, and to recovery of hydrogen sulphide from gas mixtures containing air.

One of the heretofore customary processes of producing pigment zinc sulphide involves reacting hydrogen sulphide gas with zinc sulphate solution, thereby producing an aqueous slurry containing zinc sulphide precipitate and dilute sulphuric acid. In such a process, it is desirable to maintain a partial pressure of hydrogen sulphide of at least one-half atmosphere throughout the entire precipitating reaction, otherwise the pigmentary properties of the pigment zinc sulphide are deleteriously affected. In practice the reaction vessels in which the hydrogen sulphide gas is brought into contact with zinc sulphate solution are operated under substantially atmospheric pressure in order to obviate dangerous leakage of hydrogen sulphide. This requires the maintenance of a concentration of hydrogen sulphide gas of not less than fifty per cent by volume in any of the gas in the reaction vessels, in order to maintain the partial pressure of hydrogen sulphide in contact with the solution at least at one-half atmosphere.

It is necessary to supply a substantially continuous stream of hydrogen sulphide gas to the reaction vessels and this in turn requires the substantially continuous withdrawal from the vessels of exhaust gas containing at least fifty per cent $H_2S$ by volume. The hydrogen sulphide-bearing gas thus withdrawn should not be employed for pigment zinc sulphide precipitation in its dilute condition and cannot be discharged to the atmosphere because of its poisonous character. It is necessary, therefore, either to concentrate the hydrogen sulphide-bearing gas so that it can be used for zinc sulphide precipitation or to destroy it by burning or the like.

In zinc sulphide precipitation, according to the aforementioned method, the aqueous slurry also contains hydrogen sulphide because this compound is readily soluble in dilute aqueous sulphuric acid. This zinc sulphide slurry is dewatered in a thickener or the like, and from the thickener is recovered a dilute aqueous sulphuric acid solution containing about 4 per cent $H_2SO_4$ and considerable dissolved hydrogen sulphide. Thereafter the dewatered slurry is washed with additional water to free it of acid and hydrogen sulphide. In the washing operation there is produced a liquid containing a very small proportion of $H_2SO_4$ but considerable dissolved $H_2S$. The present invention contemplates a method of recovering the hydrogen sulphide from the exhaust gas withdrawn from the reaction vessels, the hydrogen sulphide gas contained in the liquid withdrawn from the zinc sulphide precipitate in the dewatering and washing steps, or both.

In accordance with the invention, gas containing hydrogen sulphide is reacted with an aqueous slurry of calcium hydroxide under such conditions that calcium sulphydrate is formed. It is preferable to carry out the reaction in scrubbers by means of Venturi tube eductors that intimately mix the calcium hydroxide slurry with the hydrogen sulphide-bearing gases and are so associated with reaction vessels as to recirculate the calcium hydroxide slurry repeatedly in intimate contact with the hydrogen sulphide-bearing gases. It is also desirable to arrange a series of scrubbers equipped with Venturi tube eductors in such fashion that the hydrogen sulphide-bearing gases are treated in countercurrent with the slurry of calcium hydroxide.

The reacting substances are cooled so that the hydrogen sulphide reacts with calcium hydroxide to form for the most part calcium sulphydrate solution, according to the reaction:

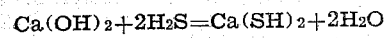
$$Ca(OH)_2 + 2H_2S = Ca(SH)_2 + 2H_2O$$

At elevated temperatures (say, in excess of 30° C.) calcium hydroxide slurry tends to react with hydrogen sulphide gas to form substantial proportions of calcium polysulphide. The formation of calcium polysulphide should be restricted because the sulphur content of this compound cannot be transformed entirely to $H_2S$ by the action of dilute sulphuric acid. Because it is desirable to recover the $H_2S$ in a form in which it can be regenerated and used to precipitate pigment zinc sulphide, the reacting slurry should be cooled to minimize or avoid the formation of calcium polysulphide. When the reacting substances are maintained at a temperature not exceeding 30° C., 90% of the absorbed sulphur can be transformed to $H_2S$ by treatment with dilute sulphuric acid.

Carbon dioxide present in the $H_2S$-bearing gases (originating from the atmosphere and from carbonates present in the ores that have been treated to generate the $H_2S$ originally) will react with the calcium hydroxide slurry to form calcium carbonate according to the following reaction:

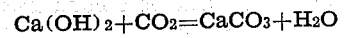
$$Ca(OH)_2 + CO_2 = CaCO_3 + H_2O$$

Calcium carbonate is substantially insoluble in water. Consequently, the product of reaction between calcium hydroxide slurry and the gases containing hydrogen sulphide and carbon dioxide comprises an aqueous solution of calcium sulphydrate mixed with calcium carbonate precipitate. Clear calcium sulphydrate liquor is separable from calcium carbonate precipitate by filtration or the like.

The calcium sulphydrate solution thus recovered may then be treated with sulphuric acid to produce concentrated and substantially pure hydrogen sulphide gas. This hydrogen sulphide gas preferably is employed to precipitate zinc sulphide from an aqueous solution of zinc sulphate or other zinc salt. The sulphuric acid employed to react with the calcium sulphydrate solution is preferably the dilute sulphuric acid containing about 4 per cent. $H_2SO_4$ from the dewatering of the zinc sulphide slurry.

The exhaust hydrogen sulphide-bearing gas from the zinc sulphide precipitation may be introduced directly into the scrubbing system for treatment with calcium hydroxide slurry. Hydrogen sulphide gas in solution in the dilute acid from the dewatering of the zinc sulphide slurry and in solution in the liquid from the washing of the zinc sulphide precipitate may be recovered by aerating or otherwise treating these liquids to expel hydrogen sulphide. The resulting mixture of hydrogen sulphide and air may then be conducted to the scrubbing system and there converted into calcium sulphydrate.

The invention will be more clearly understood in the light of the following detailed description, taken in conjunction with the accompanying flow-sheet of a preferred form of the invention as applied to the recovery and utilization of hydrogen sulphide in a plant in which pigment zinc sulphide precipitate is produced by reaction between an aqueous solution of zinc sulphate and concentrated hydrogen sulphide gas.

Referring now to the flow-sheet, it will be seen that zinc sulphide precipitate for use in pigment manufacture or the like is produced in a precipitation step by reaction between zinc sulphate solution and hydrogen sulphide gas, preferably as described in United States Patent No. 2,020,325, granted November 12, 1935. The primary supply of hydrogen sulphide gas for the precipitation step may be obtained by reacting concentrated sulphuric acid with zinc blende in a generator (not shown). Zinc blende frequently contains carbonates which react with the sulphuric acid and form carbon dioxide. The exhaust gases from the precipitation step may therefore be contaminated with variable amounts of carbon dioxide, for example, up to 20% of $CO_2$ by volume.

As described in the aforementioned patent, the reaction between zinc sulphate solution and hydrogen sulphide to precipitate zinc sulphide is preferably carried out in a series of reaction vessels equipped with Venturi eductors for intimately admixing the solution with the gas, while conducting the solution and the gas through the series of vessels in countercurrent with each other.

From the zinc sulphide precipitation step thus conducted there are two products:

(1) An aqueous slurry of zinc sulphide precipitate containing about 40 grams of $H_2SO_4$ per liter and about 2 grams of $H_2S$ per liter.

(2) An exhaust gas containing 50% or more of $H_2S$ by volume and variable amounts of carbon dioxide.

The zinc sulphide slurry from the precipitation step is dewatered by settlement or filtration, and in the dewatering step there is produced an aqueous solution containing about 40 grams of $H_2SO_4$ per liter and about 1.6 grams of $H_2S$ per liter. After dewatering the slurry is washed with water by conventional methods, and thereafter subjected to further processing such as muffling, quenching, drying and disintegration to place it into the form of a marketable pigment. In the washing step there is produced an aqueous solution containing about 5 grams of $H_2SO_4$ per liter and about 0.7 gram of $H_2S$.

The liquids produced as hereinbefore described are aerated or otherwise treated to expel hydrogen sulphide in gaseous form. The two liquids may be treated together, but it is better to treat them separately so as not to dilute the useful 4% acid solution with the weaker acid solution from the washing step.

The $H_2S$ in the liquid from the dewatering step preferably is expelled in a degassing apparatus comprising a series of closed vessels $1a$, $1b$, $1c$, arranged in series and each provided with means for bringing the solution into intimate contact with the air. In a presently preferred practice the solution from the dewatering step is sent countercurrently to air through a series of three closed tanks about five feet six inches in diameter and five feet high, each tank being provided with a high-speed air-inducting impeller. The solution is passed into these tanks at the rate of about 50 gallons per minute and contains about 40 grams of $H_2SO_4$ per liter and about 1.6 grams of $H_2S$ per liter. In countercurrent with the solution is passed about 43.7 cubic feet of air per minute. After aeration, the solution still has the same $H_2SO_4$ content, but its $H_2S$ content has dropped to 0.1 gram per liter. The mixture of gases withdrawn from the tanks amounts to about 50 cubic feet per minute at atmospheric temperature and pressure and contains 12.7% $H_2S$ by volume, the balance being principally air. In other words, about 6.3 cubic feet of $H_2S$ at atmospheric temperature and pressure are, on the average, withdrawn from the degassing apparatus in a minute.

The weak acid solution from the washing step is also treated in a degassing apparatus with air to expel its $H_2S$ content. In the aforementioned practice the apparatus for degassing the wash water is similar to that employed for degassing a solution from the dewatering step, i. e., three closed tanks $2a$, $2b$, $2c$, arranged in series, each five feet six inches in diameter and five feet high and equipped with high-speed air-inducting impellers. The air is passed through the three tanks in series in countercurrent with the solution. The input of solution to the degassers $2a$, $2b$, $2c$, amounts to about 100 gallons per minute, containing about 5 grams of $H_2SO_4$ per liter and 0.7 gram of $H_2S$ per liter. The air introduced into the degassers $2a$, $2b$, $2c$, is about 95 cubic feet per minute (at atmospheric temperature and pressure). The products of this operation are about 100 gallons per minute of liquid containing about 0.1 gram of $H_2S$ per liter, and about 100 cubic feet per minute of gas containing about 5.25% $H_2S$ by volume. In other words, the apparatus employed for degassing the solution from the washing step discharges about 5.25 cubic feet per minute of $H_2S$ at atmospheric temperature and pressure.

The acid content of the solution from the degassers $2a$, $2b$, $2c$, is too small to warrant recovery. Consequently its acid content is neutralized with a cheap compound such as lime or lime-rock, and it is then sent to waste.

The air employed for degassing the liquids may be at atmospheric temperature or higher. Other gases, such as nitrogen, which are inert with respect to hydrogen sulphide and calcium hydrate, may also be employed for degassing.

The exhaust gas from the zinc sulphide precipitation, amounting in the aforementioned practice to about 6 cubic feet per minute and containing on the average about 66% $H_2S$ and variable amounts of $CO_2$, and the gases from the two series of degassing apparatus are introduced into a scrubbing system employed for reacting the calcium hydrate slurry with $H_2S$. In practice, this apparatus comprises three closed upright cylindrical 700-gallon tanks, 3a, 3b, 3c, with inverted conical bottoms, each tank being provided with an eight inch Venturi tube eductor 12a, 12b, 12c. Calcium hydroxide slurry is introduced into an upper portion of the last tank 3c in the series through a pipe 18. The hydrogen sulphide-bearing gases from the zinc sulphide precipitation and the degassing steps are introduced into the first tank 3a of the series.

The Venturi tube eductor 12a draws the hydrogen sulphide-bearing gases into the tank 3a from a pipe 10 and at the same time withdraws hydrogen sulphide-bearing gas from the top of the tank 3a above its slurry level 19a through a gas line 11, thus establishing a circulation of $H_2S$ in the first scrubbing unit of the series. The Venturi tube eductor 12a is supplied with a stream of calcium hydroxide slurry from a pipe 13a which is connected to the pressure side of a pump 14a. The suction side of the pump 14a is connected with the conical bottom of the tank 3a. Thus, the pump 14a recirculates the slurry through the eductor 12a and the tank 3a. Slurry overflows from the tank 3b into the tank 3a through a pipe 16b disposed substantially horizontally near respective slurry levels 19b, 19a of the tanks. Slurry is discharged from the tank 3a through a pipe line 16a into a sump 4, which in practice is a tank of 12,000-gallon capacity, equipped with an agitator to keep in suspension the calcium carbonate formed in the scrubbing system.

The tanks 3b and 3c are provided respectively with pumps 14b and 14c connected on their inlet sides to the conical bottoms of the respective tanks. The tanks 3b, 3c are also provided respectively with Venturi eductors 12b, 12c, to which the outlet connections of the pumps 14b, 14c, are respectively connected. Pipe lines 15a and 15b are connected respectively from the top of the tank 3a to the inlet of the eductor 12b and from the top of the tank 3b to the inlet of eductor 12c, so that gases can be advanced from tank to tank through the series. Connected respectively to the pipe lines 15a, 15b, are two short pipes 11b, 11c, fastened respectively to and communicating with the tops of the tanks 3b, 3c. The short pipes 11b, 11c, serve the same purpose as the similar pipe 11a in the first scrubbing unit in that they permit circulation of gas from the tank upon which they are mounted through the eductor and back into the tank.

To the top of the last tank 3c in the series is connected a pipe 15c, which in turn is connected to the suction side of a fan 20 for withdrawing gases freed of $H_2S$ from the scrubbing system and discharging them to the atmosphere through a stack (not shown).

An overflow pipe 16c is connected between the tanks 3b, 3c, near their respective solution lines and permits slurry to pass through the scrubbing system generally in countercurrent to the gases. The pipes 16a, 16b, described heretofore, serve a similar purpose.

In the tank 3a and the eductor 12a, the newly introduced $H_2S$-bearing gas is brought into contact with slurry which has previously been in contact with $H_2S$-bearing gases in eductors 12b, 12c, and tanks 3b, 3c. In eductor 12c and tank 3c, the fresh slurry of calcium hydrate is brought into contact with gases which have previously been scrubbed in eductors 12a, 12b, and tanks 3a, 3b. In other words, the operation in the eductors and the adjacent tanks is a countercurrent one in which the countercurrent flow of lime slurry and $H_2S$-bearing gases from tank to tank is accompanied by recirculation of both $H_2S$ and slurry in each eductor.

In the operation of the scrubbing system just described about 1.1 gallons per minute of lime slurry containing 1.65 pounds of hydrated lime, i. e., $Ca(OH)_2$, are introduced into the top of the tank 3c through the pipe 20, and about 156 cubic feet per minute of gas containing about 9.9% $H_2S$ by volume are introduced into the eductor 12a through the pipe line 10.

If the flow of hydrogen sulphide bearing gases fluctuates, it may be advantageous to operate the scrubbing system intermittently with the use of separate batches of calcium hydroxide slurry. A fresh batch of calcium hydroxide slurry may be charged into tank 3c when needed, after room has been made for it by draining off the slurry from tank 3a into tank 4, transferring the slurry in tank 3b to tank 3a, and transferring the slurry from tank 3c to tank 3b.

As a general rule the rate of recirculation of the calcium hydroxide slurry in the Venturi tube eductors 12a, 12b, and 12c should not greatly exceed the rate necessary to effect complete hydrogen sulphide absorption, in order to prevent unnecessary formation of sulphur compounds other than calcium sulphydrate (such as, for example, polysulphides and thiosulphates).

From the stack attached to the last scrubbing tank in the series, there is discharged about 138.5 cubic feet (at atmospheric temperature and pressure) per minute of gas which is substantially free of $H_2S$.

Through the outlet 16a of the first eductor in the series is discharged into the sump 4 about 1.1 gallons per minute of an aqueous slurry containing calcium sulphydrate in solution and calcium carbonate as a finely divided precipitate. The solids, principally calcium carbonate, in the slurry range from 3 to 6% by weight.

The temperature of liquid in the scrubbing system should not exceed 30° C. in order to prevent the formation of substantial amounts of calcium polysulphide. When the heat dissipated from the scrubbing system is insufficient to prevent the temperature from rising above 30° C., the slurry may be cooled indirectly by water-jacketing the slurry-recirculating lines.

From the sump 4 the slurry containing calcium sulphydrate and calcium carbonate is sent to a disk type continuous filter 5 having about 100 square feet of effective area. A cake of calcium carbonate is formed on the filter amounting to about .0135 cubic foot per minute. In addition to calcium carbonate and any unreacted lime, the filter-cake will contain any silica or other insoluble impurities which were present in the original lime slurry. The filter-cake is sent to waste.

The filtrate from the filter 5 amounts to about .98 gallon per minute of clear calcium sulphydrate liquor containing about 175 to 225 grams per liter $Ca(SH)_2$. The filtrate is sent to a storage tank 6a which in the aforementioned practice is a 12,000-gallon tank without an agitator.

The degassed 4% acid solution from the degasser 1c (derived from the dewatering step) is sent to a storage tank 6b of 20,000 gallons capacity. From the storage tank 6b a portion of the degassed 4% acid may be withdrawn for miscellaneous uses, because there is more than enough of it to react with the calcium sulphydrate solution as hereafter described.

A pair of hydrogen sulphide generators 7a, 7b, connected in series are provided for reacting the calcium sulphydrate liquor with a portion of the degassed 4% acid. Each generator comprises a closed tank 5 feet six inches in diameter and 5 feet high provided with an agitator. The generators are connected by two pipes, an upper pipe 21 for H2S and a lower pipe 22 for slurry. In normal operation .98 gallon per minute of calcium sulphydrate liquor and 5.3 gallons per minute of degassed 4% acid are introduced into the generator 7b and reacted together in that generator and in the connected generator 7a to produce 12.4 cubic feet per minute of gas containing substantially 100% H2S (which is withdrawn from the generator 7b), and 5.35 gallons per minute of effluent liquor containing about 1 gram of H2S per liter (which is withdrawn from the generator 7a). The reaction by which the H2S is formed from the calcium sulphydrate liquor is as follows:

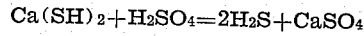

$$Ca(SH)_2 + H_2SO_4 = 2H_2S + CaSO_4$$

The substantially pure hydrogen sulphide gas produced from the calcium sulphydrate liquor is returned to the zinc sulphide precipitation step to enter into reaction with zinc sulphate.

The liquid effluent from the H2S generator into which calcium sulphydrate is fed contains a small concentration of H2S and this may be introduced into the degassers 2a, 2b, 2c, thereby reducing the loss of H2S from the system.

The invention has been described with particular reference to the purification of hydrogen sulphide from carbon dioxide. However, it is also applicable to the purification of hydrogen sulphide from sulphur dioxide.

If the gases sent to the scrubbing system contain sulphur dioxide, this compound will react with the lime slurry to form calcium sulphite, which is substantially insoluble and may be separated from the calcium sulpyhdrate solution along with any precipitate of calcium carbonate which is formed.

In the operation described hereinbefore the gases sent to the scrubbing system contain a small proportion of sulphur dioxide, this small proportion probably being due to the oxidation of hydrogen sulphide during the zinc sulphide precipitation step. This sulphur dioxide, which seldom if ever exceeds a few hundredths of a percent of the gas, is eliminated from the system as calcium sulphite by the scrubbing. H2S-bearing gases containing large proportions of SO2 can be purified effectively from SO2 by scrubbing with lime slurry in the manner described hereinbefore.

We claim:

1. In a method in which an aqueous zinc sulphate solution is reacted with hydrogen sulphide gas to produce zinc sulphide precipitate and a residual gas containing a relatively small proportion of hydrogen sulphide, the improvement which comprises reacting the residual gas in the presence of oxygen with calcium hydroxide slurry while cooling the slurry to prevent the formation of calcium polysulphide and to form calcium sulphydrate, reacting the calcium sulphydrate with strong acid to drive off hydrogen sulphide in concentrated form and returning the concentrated hydrogen sulphide to the reaction with the aqueous zinc sulphate solution to produce zinc sulphide.

2. Process according to claim 1 in which the slurry is cooled to a temperature not exceeding about 30° C. during its reaction with the hydrogen sulphide.

3. Process in accordance with claim 1 in which the calcium hydroxide slurry is forced through a Venturi eductor in contact with the dilute hydrogen sulphide gas.

4. In a method in which an aqueous zinc sulphate solution is reacted with hydrogen sulphide gas to produce zinc sulphide precipitate and a relatively dilute aqueous solution of hydrogen sulphide, the improvement which comprises aerating the dilute solution to expel therefrom hydrogen sulphide gas in dilute condition in admixture with oxygen, reacting said admixture with calcium hydroxide slurry while cooling the slurry to substantially prevent the formation of calcium polysulphide and to form calcium sulphydrate, reacting the calcium sulphydrate with sulphuric acid to drive off hydrogen sulphide in concentrated form and returning said concentrated hydrogen sulphide to the reaction with the aqueous zinc sulphate solution to produce zinc sulphide precipitate.

ARNE J. MYHREN.
SAMUEL I. HAMMOND.